(12) United States Patent
Isogai et al.

(10) Patent No.: US 8,034,742 B2
(45) Date of Patent: Oct. 11, 2011

(54) METHOD OF PRODUCING OXIDATION CATALYST FOR CLEANING EXHAUST GAS

(75) Inventors: Yuji Isogai, Wako (JP); Kiyoshi Tanaami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 12/417,388

(22) Filed: Apr. 2, 2009

(65) Prior Publication Data

US 2009/0192033 A1    Jul. 30, 2009

Related U.S. Application Data

(63) Continuation-in-part of application No. 11/730,858, filed on Apr. 4, 2007, now Pat. No. 7,572,751.

(30) Foreign Application Priority Data

Apr. 5, 2006  (JP) ................. 2006-104269

(51) Int. Cl.
*B01J 21/06* (2006.01)
*B01J 23/34* (2006.01)
*B01J 23/10* (2006.01)
*B01J 37/04* (2006.01)
*B01J 37/08* (2006.01)

(52) U.S. Cl. ........ 502/439; 502/302; 502/304; 502/350; 502/353

(58) Field of Classification Search ........... 502/302, 502/324, 325, 349, 439, 350, 353
See application file for complete search history.

(56) References Cited

U.S. PATENT DOCUMENTS

| 4,126,580 | A | 11/1978 | Lauder |
| 6,740,261 | B1 | 5/2004 | Ogata et al. |
| 2004/0089854 | A1 | 5/2004 | Chen et al. |
| 2004/0204315 | A1* | 10/2004 | Krumpelt et al. ............ 502/303 |
| 2005/0049143 | A1 | 3/2005 | Eguchi et al. |
| 2005/0230726 | A1 | 10/2005 | Li et al. |

FOREIGN PATENT DOCUMENTS

| JP | 07-116519 A | 5/1995 |
| JP | 2003-334443 A | 11/2003 |
| WO | WO 2004/105937 | * 12/2004 |

OTHER PUBLICATIONS

J.E. Greedan, Gregory J. McCarthy, and Carol Sipe, "Complex Oxides Containing Divalent Europium. II. (Eu(M,M')O3) Phases," Inorganic Chemistry, vol. 14 No. 4 (1975), pp. 775-779.*

(Continued)

*Primary Examiner* — Stanley Silverman
*Assistant Examiner* — Diana J Liao
(74) *Attorney, Agent, or Firm* — Birch, Stewart, Kolasch & Birch, LLP

(57) ABSTRACT

The present invention provides a method of producing an oxidation catalyst for cleaning exhaust gas, capable of achieving an excellent catalytic activity at a lower temperature for particulates and high boiling point hydrocarbons in exhaust gas from internal-combustion engines. A primary firing is performed after mixing nitrate of a first metal element Ln, manganese nitrate, and oxide of a third metal element A. A resultant material from the primary firing is subjected to grinding and then a secondary firing is performed at the range of 600 to 1200° C. for 1 to 5 hours. By doing so, a catalyst comprising a composite metal oxide represented by the general formula $Ln_yMn_{1-x}A_xO_3$ is obtained.

7 Claims, 7 Drawing Sheets

OTHER PUBLICATIONS

Asokan et al., "Comparison of electronic structures of orthorhombic and hexagonal manganites studied by X-ray absorption spectroscopy", Solid State Communications, vol. 134, 2005, pp. 821-826.

Filippetti et al., "First principles study of structural, electronic and magnetic interplay in ferroelectromagnetic yttrium manganite", Journal of Magnetism and Magnetic Materials, vol. 236, pp. 176-189, 2001.

* cited by examiner

US 8,034,742 B2

METHOD OF PRODUCING OXIDATION CATALYST FOR CLEANING EXHAUST GAS

This application is a Continuation-In-Part of copending application Ser. No. 11/730,858 filed on Apr. 4, 2007, the entire contents of which are hereby incorporated by reference and for which priority is claimed under 35 U.S.C. §120 and to Patent Application No. 2006-104269 filed in Japan on Apr. 5, 2006, the entire contents of which are hereby incorporated by reference and for which priority is claimed under 35 U.S.C §119.

BACKGROUND OF THE INVENTION

1. Field of the Invention

The present invention relates to a method of producing an oxidation catalyst for cleaning exhaust gas, oxidizing particulates and hydrocarbons contained in exhaust gas from internal-combustion engines to clean the gas.

2. Description of the Related Art

For oxidizing particulates and hydrocarbons contained in exhaust gas from internal-combustion engines to clean the gas, oxidation catalysts comprising perovskite-type composite metal oxides have been previously known.

As the perovskite-type composite metal oxide used as the above-described oxidation catalyst, there is known, for example, a composite metal oxide represented by the general formula: $AB_{1-x}C_xO_3$, wherein A is at least one metal selected from the group consisting of La, Sr, Ce, Ba, and Ca; B is at least one metal selected from the group consisting of Co, Fe, Ni, Cr, Mn, and Mg; and C is one of Pt and Pd (see Japanese Patent Laid-Open No. 07-116519).

As the perovskite-type composite metal oxide used as the above-described oxidation catalyst, there is also known, for example, a composite metal oxide represented by the general formula: $Ce_xM_{1-x}ZrO_3$, wherein M is at least one metal selected from the group consisting of La, Sm, Nd, Gd, Sc, and Y; and $0.1 \leq x \leq 20$ (see, for example, Japanese Patent Laid-Open No. 2003-334443).

However, the above-described conventional perovskite-type composite metal oxides have drawbacks that they have high oxidation temperatures for particulates and high boiling point hydrocarbons and cannot achieve sufficient catalytic activities.

SUMMARY OF THE INVENTION

The object of the present invention is to eliminate such drawbacks and to provide a method of producing an oxidation catalyst for cleaning exhaust gas, capable of achieving an excellent catalytic activity at a lower temperature for particulates and high boiling point hydrocarbons in exhaust gas from internal-combustion engines.

For accomplishing this object, the present invention provides a method of producing an oxidation catalyst for cleaning exhaust gas, which oxidizes contents in exhaust gas from internal-combustion engines to clean the gas, and which comprises a composite metal oxide including a first metal element Ln, Mn as a second metal element, and a third metal element A, represented by the general formula $Ln_yMn_{1-x}A_xO_3$, the method comprising the steps of: selecting one metal element as the first metal element Ln from the group consisting of Sc, Y, Ho, Er, Tm, Yb, and Lu; and selecting one metal element as the third metal element A from the group consisting of Ti, Nb, Ta, and Ru; mixing nitrate of the first metal element Ln, manganese nitrate, and oxide of the third metal element A, so that x falls within the range of 0.005 to 0.2 and y falls within the range of 0.9 to 1.0, and thereafter performing primary firing; and subjecting a resultant material from the primary firing process to grinding and thereafter performing secondary firing at the range of 600 to 1200° C. for 1 to 5 hours.

Further, it is preferable to subject the resultant material from the primary firing process to grinding and thereafter perform secondary firing at 1000° C. for 1 hour.

The oxidation catalyst for cleaning exhaust gas produced according to the method of the present invention is one in which metal A as a third metal component is added to a composite metal oxide represented by the general formula: $LnMnO_3$ to produce a distortion in the crystal lattice thereof, or the metal component A is added thereto to produce a defect in a portion of the crystal lattice as well as the distortion in the crystal lattice, thereby increasing the catalytic activity and reducing the bond energy of oxygen in the crystal lattice. As a result, the above-mentioned oxidation catalyst for cleaning exhaust gas can oxidize contents such as particulates and high boiling point hydrocarbons contained in exhaust gas from internal-combustion engines at a lower temperature and also cause a faster oxidation than an oxidation catalyst comprising a compound represented by the general formula: $LnMnO_3$.

The oxidation catalyst for cleaning exhaust gas produced according to the method of the present invention produces a lower bond energy of oxygen in the crystal lattice of the composite metal oxide represented by the general formula: $LnMnO_3$, first when y=1, by metal A as a third metal component being added to the oxide to cause a distortion in the crystal lattice. As a result, the above-mentioned oxidation catalyst for cleaning exhaust gas can oxidize the particulates, high boiling point hydrocarbons, and the like at a lower temperature than the oxidation catalyst comprising the composite metal oxide represented by the general formula: $LnMnO_3$. Here, x less than 0.005 renders insufficient the effect of producing a distortion in the crystal lattice; x more than 0.2 makes it difficult to maintain the crystal lattice.

Then, the oxidation catalyst for cleaning exhaust gas produced according to the method of the present invention produces a lower bond energy of oxygen in the crystal lattice of the composite metal oxide represented by the general formula: $LnMnO_3$, when $0.9 \leq y < 1$, by metal A as a third metal component being added to the oxide to cause a defect in a portion of the Ln site constituting the crystal lattice as well as a distortion in the crystal lattice. As a result, the above-mentioned oxidation catalyst for cleaning exhaust gas can oxidize the particulates, high boiling point hydrocarbons, and the like at a lower temperature and also cause a faster oxidation than the oxidation catalyst comprising the composite metal oxide represented by the general formula: $LnMnO_3$.

Here, y less than 0.9 produces an excessive defect to make it difficult to maintain the crystal lattice; y at 1 cannot produce a defect in the crystal lattice. In addition, x can be in the above-described range to balance the positive and negative electric charges of the constituent atoms in the composite metal oxide.

In the method mentioned above, Ln may be a metal selected from the group consisting of Sc, Y, Ho, Er, Tm, Yb, and Lu, but is preferably Y.

DETAILED DESCRIPTION OF THE PREFERRED EMBODIMENTS

Figure 1:
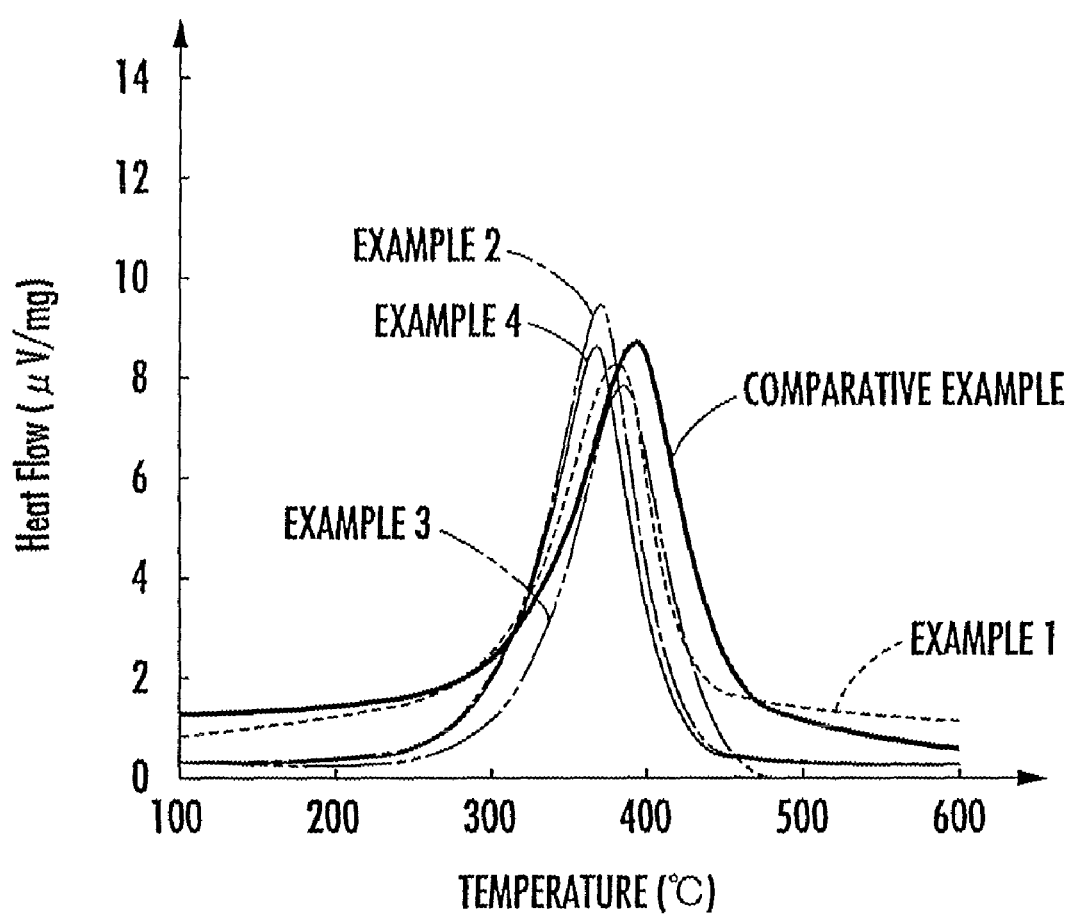
FIG. 1 is a graph showing the effects of catalysts for cleaning exhaust gas produced in accordance with the method of the present invention.

An embodiment of the present invention will now be described in further detail with reference to the accompanying drawings.

A catalyst for cleaning exhaust gas according to a first aspect of the present embodiment comprises a composite metal oxide represented by the general formula: $YMn_{1-x}A_xO_3$, wherein A is a metal selected from the group consisting of Ti, Nb, Ta, and Ru; and $0.005 \leq x \leq 0.2$. The composite metal oxide produces a lower bond energy of oxygen in the crystal lattice of $YMnO_3$ by a portion of Mn being the metal A to cause a distortion in the crystal lattice. As a result, the metal oxide can have an increased catalytic activity compared to $YMnO_3$ and can oxidize contents such as particulates and high boiling point hydrocarbons contained in the exhaust gas at a lower temperature.

A catalyst for cleaning exhaust gas according to a second aspect of the present embodiment is a composite metal oxide similar to the catalyst for cleaning exhaust gas according to the first aspect, but different from it only in that the former is represented by the general formula: $Y_yMn_{1-x}A_xO_3$ except with $0.9 \leq y < 1$. The composite metal oxide produces a lower bond energy of oxygen in the crystal lattice of $YMnO_3$ by a defect arising in a portion of the Y site constituting the crystal lattice as well as by a portion of Mn being the metal A to cause a distortion in the crystal lattice. As a result, the metal oxide can have an increased catalytic activity compared to $YMnO_3$, can oxidize contents such as particulates and high boiling point hydrocarbons contained in the exhaust gas at a lower temperature, and even can promote the oxidation.

Here, the above-described x and y are set so as to balance the positive and negative electric charges of the constituent atoms in the composite metal oxide.

By way of example, Y and Mn are positive trivalent, and O is negative bivalent. Accordingly, when the metal A is one of Ti and Ru and positive tetravalent, setting $y=1-x/3$ and $x=0.15$ leads to the general formula:

$Y_yMn_{1-x}A_xO_3$ being equal to $Y_{0.95}Mn_{0.85}A_{0.15}O_3$.

Here, the sum of positive charges is:

(3×0.95)+(3×0.85)+(4×0.15)=2.85+2.55+0.60=+6.00; and the sum of negative charges is:

(−2)×3=−6.

Therefore, it follows that (+6.00)+(−6)=0, the positive and negative charges being balanced.

When the metal A is one of Nb and Ta and positive pentavalent, setting $y=1-2x/3$ and $x=0.075$ leads to the general formula: $Y_yMn_{1-x}A_xO_3$ being equal to $Y_{0.95}Mn_{0.925}A_{0.075}O_3$.

Here, the sum of positive charges is:

(3×0.95)+(3×0.925)+(5×0.075)=2.85+2.775+0.375=+6.00; and the sum of negative charges is:

(−2)×3=−6.

Therefore, it follows that (+6.00)+(−6)=0, the positive and negative charges being balanced.

When the metal A is one of Nb and Ta and positive pentavalent, $y=1-2x/3$ and $x=0.15$ may be also set.

This setting leads to the general formula: $Y_yMn_{1-x}A_xO_3$ being equal to $Y_{0.9}Mn_{0.85}A_{0.15}O_3$.

Here, the sum of positive charges is:

(3×0.9)+(3×0.85)+(5×0.075)=2.7+2.55+0.75=+6.00; and the sum of negative charges is:

(−2)×3=−6.

Therefore, it follows that (+6.00)+(−6)=0, the positive and negative charges being balanced.

Examples and Comparative Example of the present invention will now be given.

EXAMPLE 1

In this Example, first, yttrium acetate, manganese nitrate, and anatase type titanium oxide were used in such amounts that a molar ratio thereof of 1:0.95:0.05 is obtained, and mixed in a ball mill for 5 hours, followed by primary firing at 250° C. for 30 minutes, at 300° C. for 30 minutes, and at 350° C. for one hour. Ethanol was then added to the resultant material from the primary firing process, which was then subjected to wet grinding using a ball mill before drying, followed by secondary firing at 1,000° C. for one hour to provide a powder of the composite metal oxide represented by $YMn_{0.95}Ti_{0.05}O_3$.

The composite metal oxide powder obtained in this Example was then subjected to differential thermal analysis (DTA) for the activity evaluation thereof. The differential thermal analysis was performed by using the composite metal oxide powder obtained in this Example as a catalyst for cleaning exhaust gas to mix 2.5 mg of carbon black with 50 mg of the catalyst, followed by heating the mixture at a rate of temperature rise of 10° C./minute under an atmosphere of an air stream of 15 ml/minute to determine a relationship between heat flow and temperature.

The above-described carbon black corresponds to particulates or a high boiling point hydrocarbon contained in the exhaust gas. In the heat flow, the peak thereof indicates the burning temperature of the carbon black; a higher peak shows that the burning is more promoted. The result is shown in FIG. 1.

EXAMPLE 2

In this Example, the composite metal oxide represented by $YMn_{0.95}Nb_{0.05}O_3$ was obtained just as described in Example 1 except for the use of niobium oxide in place of anatase type titanium oxide.

A relationship between heat flow and temperature was then determined just as described in Example 1 except for the use of the composite metal oxide obtained in this Example as a catalyst for cleaning exhaust gas. The result is shown in FIG. 1.

EXAMPLE 3

In this Example, the composite metal oxide represented by $YMn_{0.95}Ta_{0.05}O_3$ was obtained just as described in Example 1 except for the use of tantalum oxide in place of anatase type titanium oxide.

A relationship between heat flow and temperature was then determined just as described in Example 1 except for the use of the composite metal oxide obtained in this Example as a catalyst for cleaning exhaust gas. The result is shown in FIG. 1.

EXAMPLE 4

In this Example, the composite metal oxide represented by $YMn_{0.95}Ru_{0.05}O_3$ was obtained just as described in Example 1 except for the use of ruthenium oxide in place of anatase type titanium oxide.

A relationship between heat flow and temperature was then determined just as described in Example 1 except for the use of the composite metal oxide obtained in this Example as a catalyst for cleaning exhaust gas. The result is shown in FIG. 1.

COMPARATIVE EXAMPLE 1

In this Comparative Example, the composite metal oxide represented by $YMnO_3$ was obtained just as described in Example 1 except for no use of anatase type titanium oxide.

A relationship between heat flow and temperature was then determined just as described in Example 1 except for the use of the composite metal oxide obtained in this Comparative Example as a catalyst for cleaning exhaust gas. The result is shown in FIG. 1.

It is apparent from FIG. 1 that the catalysts for cleaning exhaust gas of Examples 1 to 4 can oxidize (burn) the above-described carbon black at low temperature compared to the catalyst for cleaning exhaust gas of Comparative Example 1, which comprises the composite metal oxide represented by $YMnO_3$.

EXAMPLE 5

In this Example, the composite metal oxide represented by $Y_{0.95}Mn_{0.85}Ti_{0.15}O_3$ was obtained just as described in Example 1 except for the use of yttrium acetate, manganese nitrate, and anatase type titanium oxide in such amounts that a molar ratio thereof of 0.95:0.85:0.15 is obtained.

EXAMPLE 5-2

In this example, the composite metal oxide represented by $Y_{0.95}Mn_{0.85}Ti_{0.15}O_3$ was obtained just as described in Example 5 except that the secondary firing was conducted at 600° C. for 5 hours.

EXAMPLE 5-3

In this example, the composite metal oxide represented by $Y_{0.95}Mn_{0.85}Ti_{0.15}O_3$ was obtained just as described in Example 5 except that the secondary firing was conducted at 1200° C. for 1 hour.

A relationship between heat flow and temperature was then determined just as described in Example 1 except for the use of the composite metal oxide obtained in this Example as a catalyst for cleaning exhaust gas. The result is shown together with the result of Comparative Example 1 in FIG. 2.

Figure 2:
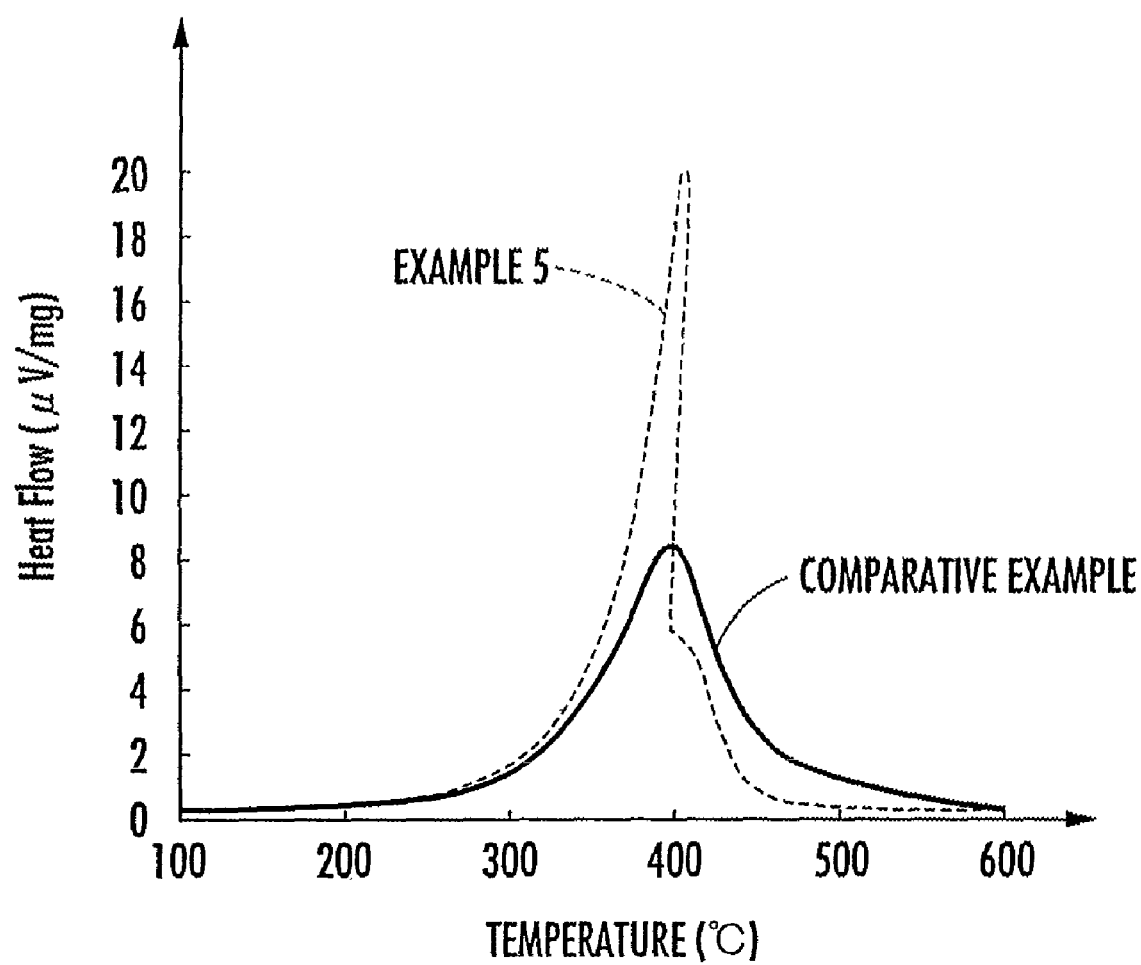
FIG. 2 is a graph showing the effect of a catalyst for cleaning exhaust gas produced in accordance with the method of the present invention.

It is apparent from FIG. 2 that the catalyst for cleaning exhaust gas of Example 5 can oxidize (burn) the above-described carbon black at low temperature and can achieve the effect of further promoting the oxidation, compared to the catalyst for cleaning exhaust gas of Comparative Example 1, which comprises the composite metal oxide represented by $YMnO_3$.

EXAMPLE 6

In this Example, the composite metal oxide represented by $Y_{0.95}Mn_{0.925}Nb_{0.075}O_3$ was obtained just as described in Example 1 except for the use of yttrium acetate, manganese nitrate, and niobium oxide in such amounts that a molar ratio thereof of 0.95:0.925:0.075 is obtained.

A relationship between heat flow and temperature was then determined just as described in Example 1 except for the use of the composite metal oxide obtained in this Example as a catalyst for cleaning exhaust gas. The result is shown together with the result of Comparative Example 1 in FIG. 3.

EXAMPLE 7

In this Example, the composite metal oxide represented by $Y_{0.9}Mn_{0.85}Nb_{0.15}O_3$ was obtained just as described in Example 1 except for the use of yttrium acetate, manganese nitrate, and niobium oxide in such amounts that a molar ratio thereof of 0.9:0.85:0.15 is obtained.

A relationship between heat flow and temperature was then determined just as described in Example 1 except for the use of the composite metal oxide obtained in this Example as a catalyst for cleaning exhaust gas. The result is shown together with the result of Comparative Example 1 in FIG. 3.

Figure 3:
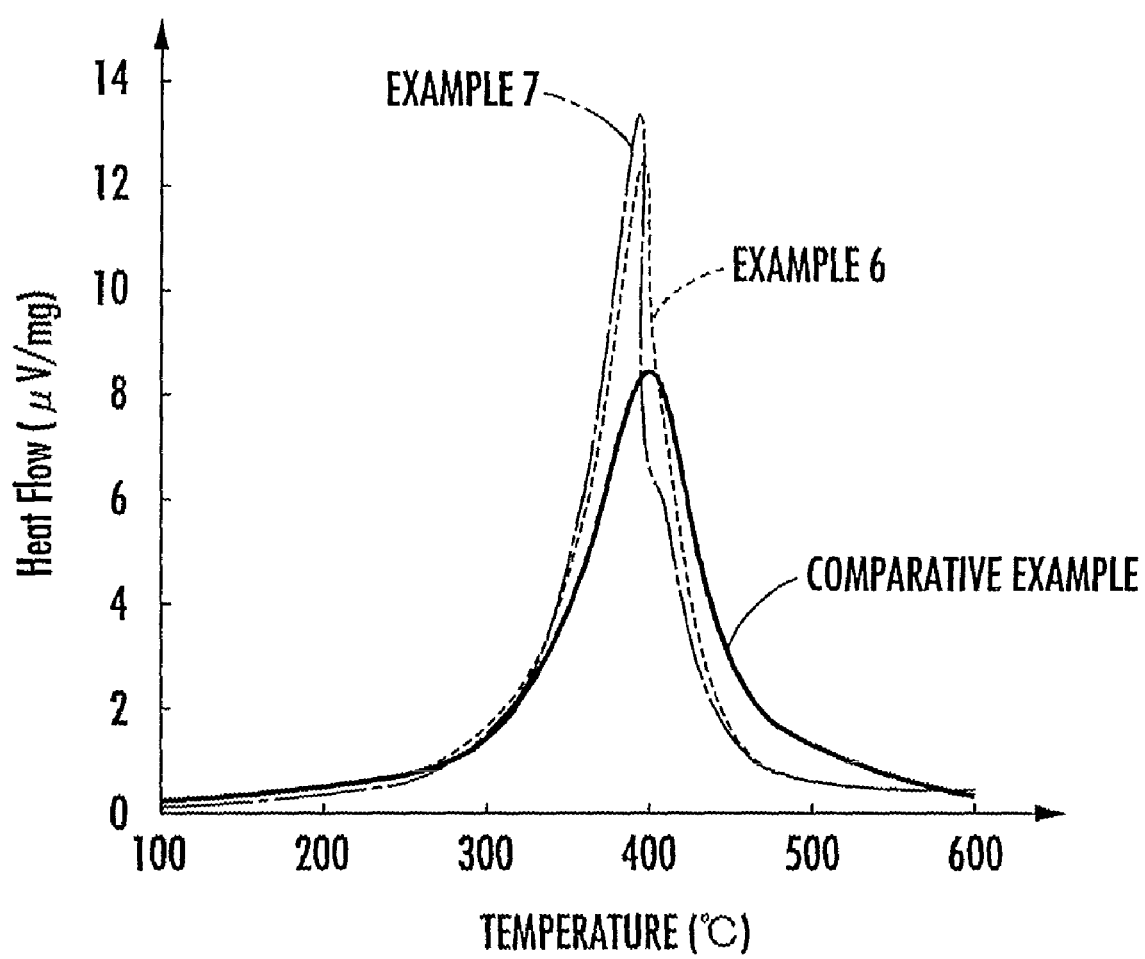
FIG. 3 is a graph showing the effects of catalysts for cleaning exhaust gas produced in accordance with the method of the present invention.

It is apparent from FIG. 3 that the catalysts for cleaning exhaust gas of Examples 6 and 7 can oxidize (burn) the above-described carbon black at low temperature and can achieve the effect of further promoting the oxidation, compared to the catalyst for cleaning exhaust gas of Comparative Example 1, which comprises the composite metal oxide represented by $YMnO_3$.

EXAMPLE 8

In this Example, the composite metal oxide represented by $Y_{0.95}Mn_{0.925}Ta_{0.075}O_3$ was obtained just as described in Example 1 except for the use of yttrium acetate, manganese nitrate, and tantalum oxide in such amounts that a molar ratio thereof of 0.95:0.925:0.075 is obtained.

A relationship between heat flow and temperature was then determined just as described in Example 1 except for the use of the composite metal oxide obtained in this Example as a catalyst for cleaning exhaust gas. The result is shown together with the result of Comparative Example 1 in FIG. 4.

EXAMPLE 9

In this Example, the composite metal oxide represented by $Y_{0.9}Mn_{0.85}Ta_{0.15}O_3$ was obtained just as described in Example 1 except for the use of yttrium acetate, manganese nitrate, and tantalum oxide in such amounts that a molar ratio thereof of 0.9:0.85:0.15 is obtained.

A relationship between heat flow and temperature was then determined just as described in Example 1 except for the use of the composite metal oxide obtained in this Example as a catalyst for cleaning exhaust gas. The result is shown together with the result of Comparative Example 1 in FIG. 4.

Figure 4:
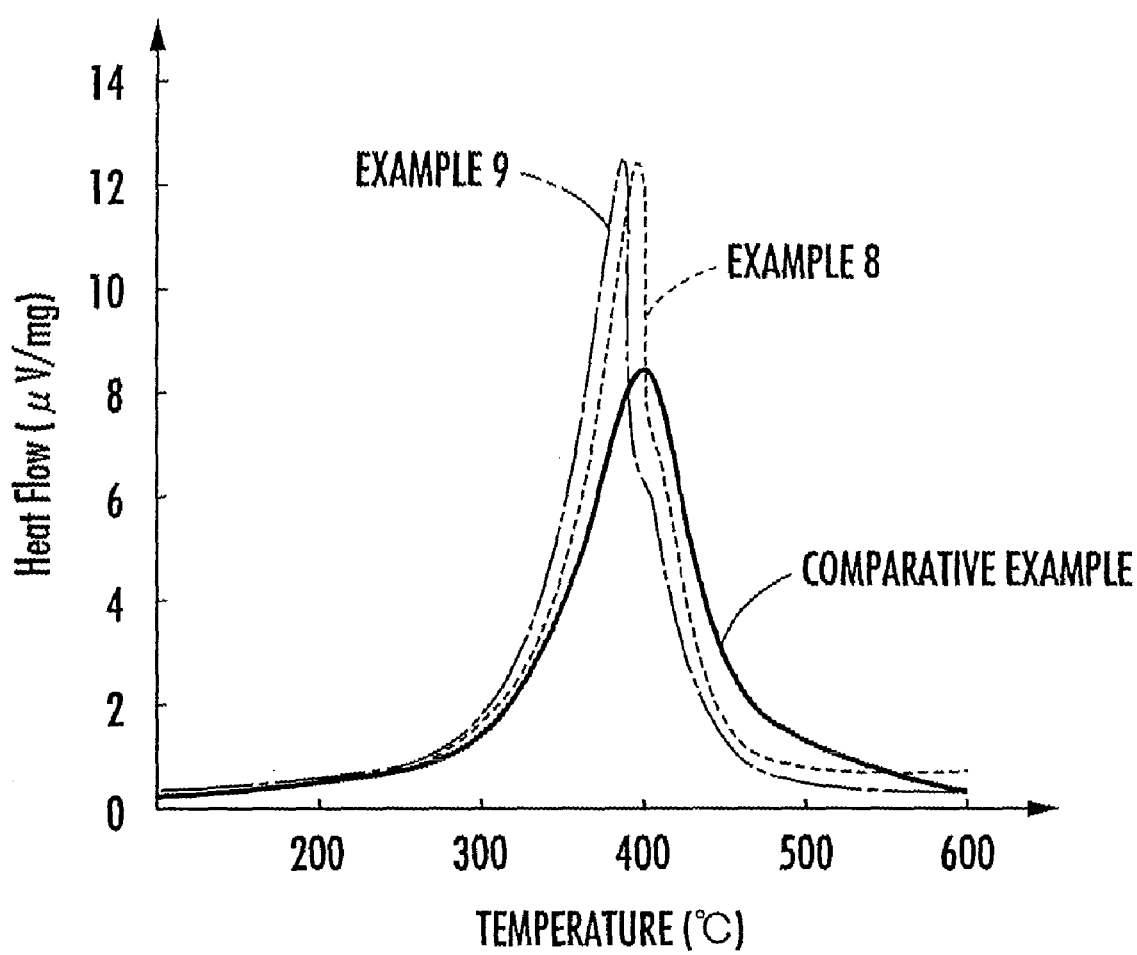
FIG. 4 is a graph showing the effects of catalysts for cleaning exhaust gas produced in accordance with the method of the present invention.

It is apparent from FIG. 4 that the catalysts for cleaning exhaust gas of Examples 8 and 9 can oxidize (burn) the above-described carbon black at low temperature and can achieve the effect of further promoting the oxidation, compared to the catalyst for cleaning exhaust gas of Comparative Example 1, which comprises the composite metal oxide represented by $YMnO_3$.

EXAMPLE 10

In this Example, the composite metal oxide represented by $Y_{0.95}Mn_{0.85}Ru_{0.15}O_3$ was obtained just as described in Example 1 except for the use of yttrium acetate, manganese nitrate, and ruthenium oxide in such amounts that a molar ratio thereof of 0.95:0.85:0.15 is obtained.

A relationship between heat flow and temperature was then determined just as described in Example 1 except for the use of the composite metal oxide obtained in this Example as a catalyst for cleaning exhaust gas. The result is shown together with the result of Comparative Example 1 in FIG. 5.

Figure 5:
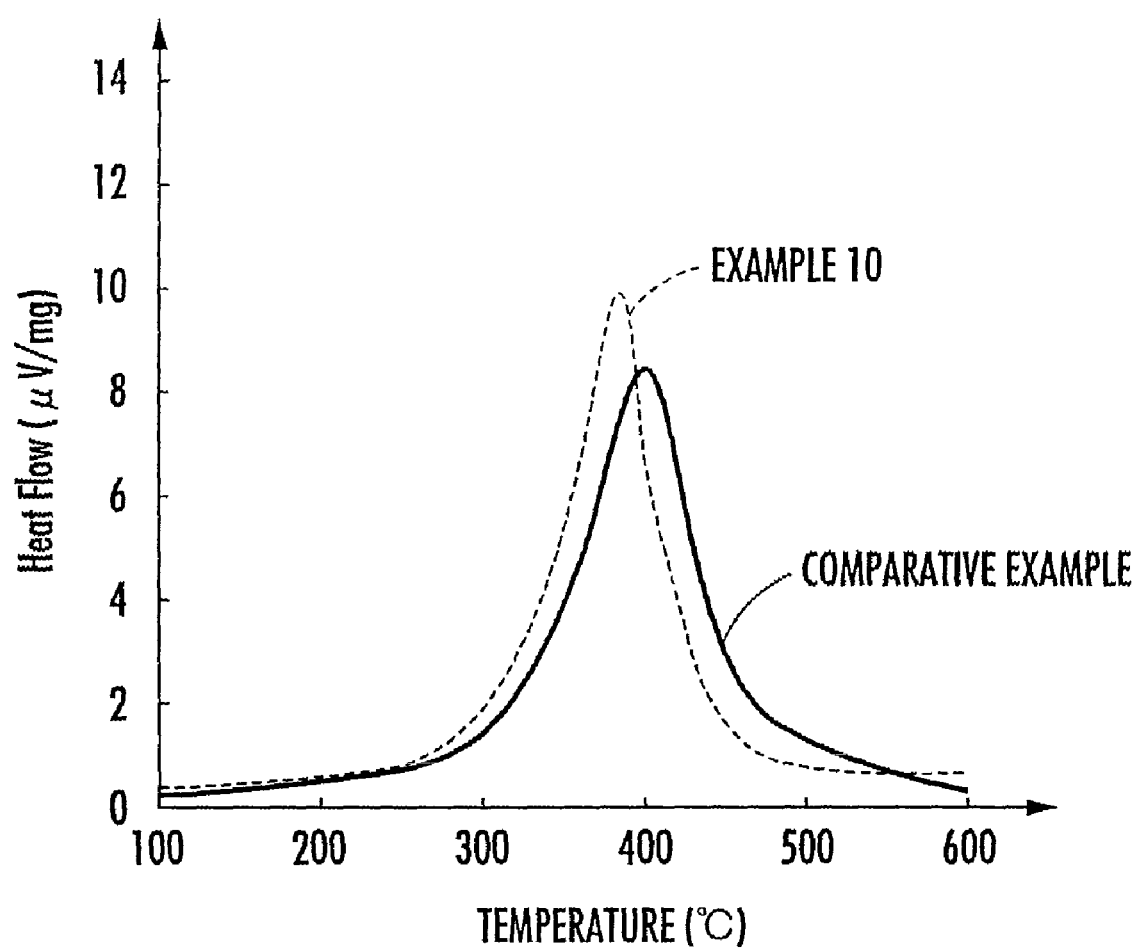
FIG. 5 is a graph showing the effect of a catalyst for cleaning exhaust gas produced in accordance with the method of the present invention.

It is apparent from FIG. 5 that the catalyst for cleaning exhaust gas of Example 10 can oxidize (burn) the above-described carbon black at low temperature and can achieve the effect of further promoting the oxidation, compared to the catalyst for cleaning exhaust gas of Comparative Example 1, which comprises the composite metal oxide represented by $YMnO_3$.

EXAMPLE 11

In this Example, the composite metal oxide represented by $YMn_{0.995}Ru_{0.005}O_3$ was obtained just as described in Example 1 except for the use of yttrium acetate, manganese nitrate, and ruthenium oxide in such amounts that a molar ratio thereof of 1:0.995:0.005 is obtained.

A relationship between heat flow and temperature was then determined just as described in Example 1 except for the use of the composite metal oxide obtained in this Example as a catalyst for cleaning exhaust gas. The result is shown together with the result of Comparative Example 1 in FIG. 6.

Figure 6:
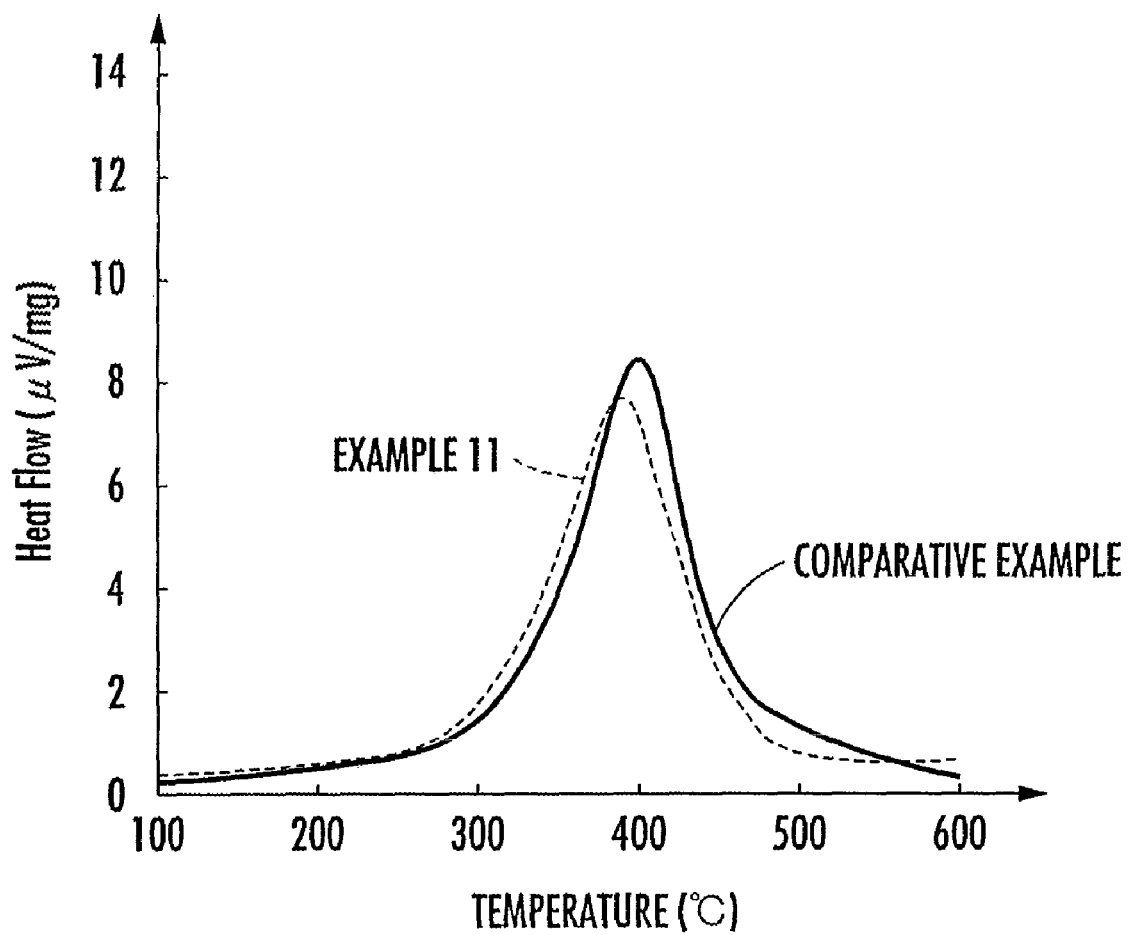
FIG. 6 is a graph showing the effect of a catalyst for cleaning exhaust gas produced in accordance with the method of the present invention.

It is apparent from FIG. 6 that the catalyst for cleaning exhaust gas of Example 11 can oxidize (burn) the above-described carbon black at low temperature and can achieve the effect of further promoting the oxidation, compared to the catalyst for cleaning exhaust gas of Comparative Example 1, which comprises the composite metal oxide represented by $YMnO_3$.

COMPARATIVE EXAMPLE 2

In this Comparative Example, the composite metal oxide was obtained under the same conditions as those of the composite metal oxides as described in Example 5, Example 5-2 and Example 5-3, respectively, except for the secondary firing condition in which the composite metal oxide is fired not at 1000° C. for 1 hour but at 1200° C. for 10 hours, after the resultant material from the primary firing process was subjected to grinding.

Figure 7:
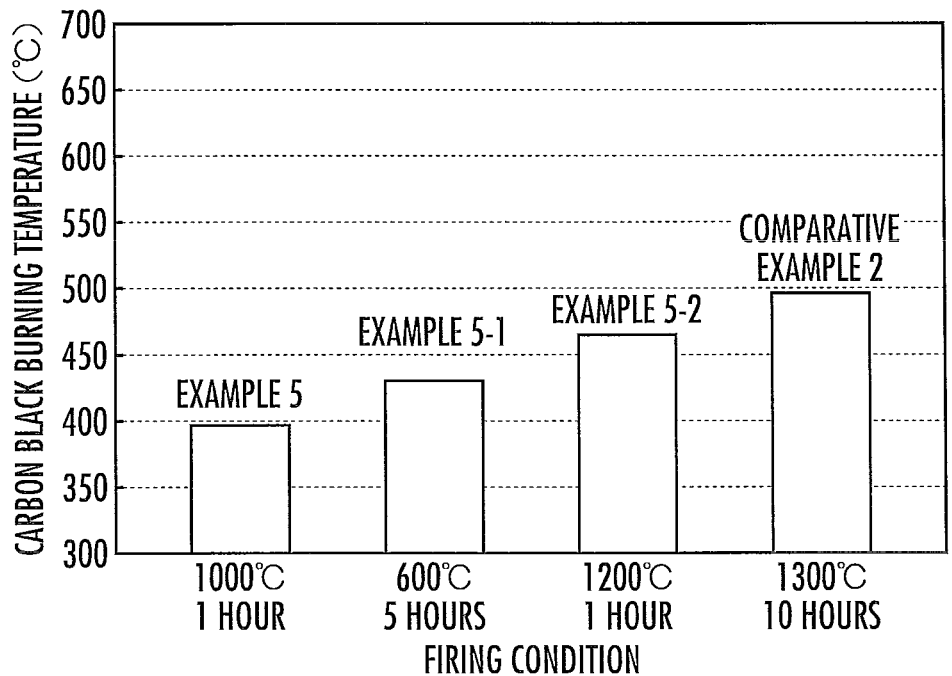
FIG. 7 is a graph indicating the relationship between the secondary firing condition during production procedure of the composite metal oxide and the burning temperature of the carbon black.

It is apparent from FIG. 7 that the burning temperatures of the carbon black of the composite metal oxides according to Example 5, Example 5-2 and Example 5-3, respectively, are lower by 30° C. to 100° C. than in the case of the composite metal oxide according to Comparative Example 2. Thus, it is clear that by controlling the secondary firing condition as in the present invention, it is possible to provide excellent oxidation characteristic to the composite metal oxide.

Figure 8:
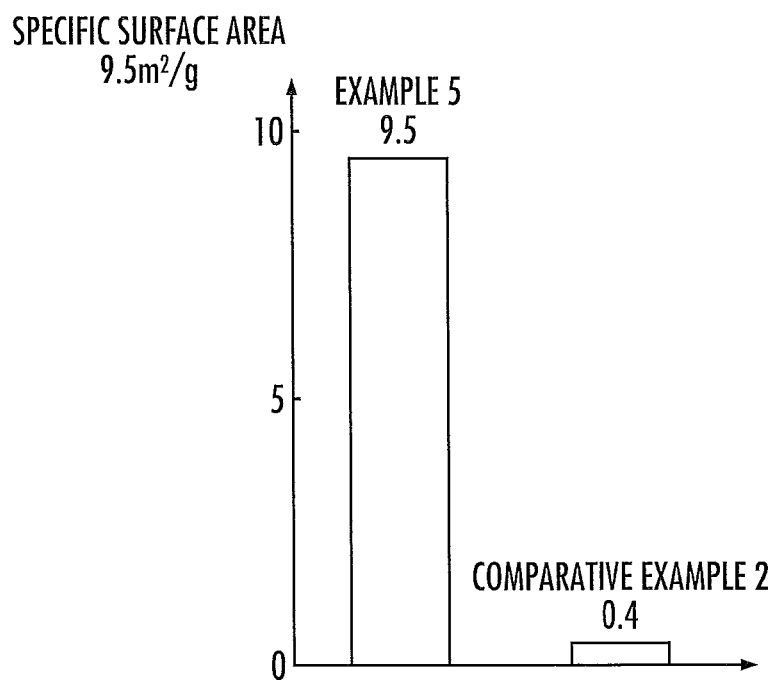
FIG. 8 is a graph indicating the relationship between the secondary firing condition during production procedure of the composite metal oxide and the specific surface area of the composite metal oxide.

Further, as is apparent from FIG. 8, the composite metal oxide according to Example 5 has larger specific surface area than the composite metal oxide according to Comparative Example 2. Thus, it is clear that by controlling the secondary firing condition as in the present invention, it is possible to provide excellent catalyst activity to the composite metal oxide. Here, the specific surface area may be measured according to know technique such as a BET method and the like.

What is claimed is:

1. A method of producing an oxidation catalyst for cleaning exhaust gas, which oxidizes contents in exhaust gas from internal-combustion engines to clean the gas, and which comprises a composite metal oxide including a first metal element Ln, Mn as a second metal element, and a third metal element A, represented by the general formula $Ln_yMn_{1-x}A_xO_3$, the method comprising the steps of:

selecting one metal element as the first metal element Ln from the group consisting of Sc, Y, Ho, Er, Tm, Yb, and Lu; and selecting one metal element as the third metal element A from the group consisting of Ti, Nb, and Ta;

mixing nitrate of the first metal element Ln, manganese nitrate, and oxide of the third metal element A, so that x has a value ranging from 0.005 to 0.2, and y has a value ranging from 0.9 to 1.0, and thereafter performing primary firing; and subjecting a resultant material from the primary firing process to grinding and thereafter performing secondary firing at the range of 600 to 1200° C. for 1 to 5 hours.

2. The method according to claim 1, wherein the resultant material from the primary firing process is subjected to grinding and thereafter secondary firing is performed at 1000° C. for 1 hour.

3. The method according to claim 1, wherein Y is selected as the first metal element Ln.

4. The method according to claim 1, wherein the first metal element Ln is selected from the group consisting of Sc, Ho, Er, Tm, Yb, and Lu.

5. The method according to claim 1, wherein the resultant material from the primary firing process is subjected to grinding and thereafter secondary firing is performed at 1200° C. for 1 hour.

6. The method according to claim 2, wherein Ti is selected as the third metal element A.

7. The method according to claim 5, wherein Ti is selected as the third metal element A.

* * * * *